(12) United States Patent
Muto et al.

(10) Patent No.: US 8,439,799 B1
(45) Date of Patent: May 14, 2013

(54) CONTROLLER FOR AUTOMATIC TRANSMISSION

(75) Inventors: Akio Muto, Wako (JP); Fumio Egashira, Wako (JP); Eijiro Shimabukuro, Wako (JP); Osahide Miyamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/491,330

(22) Filed: Jun. 7, 2012

(51) Int. Cl.
*B60W 10/02* (2006.01)
*B60W 10/10* (2012.01)
*F16H 59/00* (2006.01)

(52) U.S. Cl.
USPC .............................................. 477/76; 477/98

(58) Field of Classification Search .................... 477/76, 477/98, 180
See application file for complete search history.

(56) References Cited

U.S. PATENT DOCUMENTS

| | | | |
|---|---|---|---|
| 5,722,912 A * | 3/1998 | Narita | 477/64 |
| 6,547,695 B2 * | 4/2003 | Yamashita et al. | 477/98 |
| 7,003,388 B2 * | 2/2006 | Nakamura | 701/67 |

* cited by examiner

*Primary Examiner* — Edwin A Young
(74) *Attorney, Agent, or Firm* — Arent Fox LLP

(57) ABSTRACT

A controller for automatic transmission that performs feedback control on a slip ratio of a lockup clutch is adapted to select one target slip ratio from a plurality of target slip ratios based on a detected automatic transmission fluid temperature of a torque converter. Thus, the controller can ensure good followability to a target value of the feedback control even when the automatic transmission fluid temperature is low. The controller can effectively prevent engine hunting and the associated vibrations of vehicle body. Therefore, the controller can accomplish a favorable slip control of the lockup clutch even if an operating range of the lockup clutch is expanded to a range where the automatic transmission fluid temperature is low.

4 Claims, 11 Drawing Sheets

CONTROLLER FOR AUTOMATIC TRANSMISSION

BACKGROUND OF THE INVENTION

1. Field of the Invention

The present invention relates to a controller for an automatic transmission having a torque converter with lockup clutch. More particularly, the invention relates to a controller providing control to switch target slip ratios of the lockup clutch, according to a running condition of a vehicle.

2. Description of the Related Art

The automatic transmission for use in vehicle is provided with the lockup clutch which is incorporated in a torque converter and adapted to mechanically interconnect an output shaft of an engine and an input shaft of the automatic transmission. It has been a common practice to keep engine speed low by engaging the lockup clutch under given conditions so as to achieve better fuel economy.

The lockup clutch is normally placed in engagement when the automatic transmission is shifted into a predetermined gear. When fully engaged, however, the lockup clutch is incapable of absorbing shock transmitted between the above input shaft and output shaft. It is therefore a common practice to provide a slip control in which the lockup clutch is placed in slipping engagement rather than in full engagement depending upon driving status of the vehicle. According to such a slip control, a target slip ratio for the lockup clutch according to a driving status is previously stored in correspondence to each of the gears, so that the engaging capacity of the lockup clutch is controlled (through feedback) in a manner such that an actual slip ratio of the lockup clutch conforms to the target slip ratio.

In recent design contemplated to achieve even better fuel economy, a working range of the lockup clutch is expanded by setting an even lower temperature for automatic transmission fluid (ATF) at the start of control of the lockup clutch. In this case, however, a friction modifier present in the automatic transmission fluid is less activated so that the lockup clutch is deteriorated in friction characteristic. This makes the above-described feedback control instable, which may lead to engine hunting and associated vibration of vehicle body.

More specifically, a wet type clutch generally has a friction characteristic that if the clutch has a constant surface pressure, transmission torque (T) is increased with the increase in differential rotation (V) (characteristic graphically represented by an ever increasing curve). To engage the clutch, therefore, hydraulic pressure may be applied to the clutch with a predetermined variation (gradient). In a state where the automatic transmission fluid is at low temperatures, however, the friction modifier is not fully activated and hence, the above-described differential rotation-transmission torque characteristic (V-T characteristic) of the clutch is graphically represented by a flat line or ever decreasing curve. If the application of hydraulic pressure is continued in this state, the clutch is prone to abrupt change in transmission torque so as to be lowered in followability to a target value of the feedback control. This results in an increased incidence of the engine hunting.

According to automatic transmissions disclosed in JP-A-Hei 3-30023 and JP-B-3585207, the feedback control of the engaging capacity of the lockup clutch is performed in a manner such that feedback gain is switched according to the temperature of the automatic transmission fluid. However, only the control by switching the feedback gain according to the automatic; transmission fluid temperature cannot fully improve the lockup clutch in the followability to the target value of the feedback control. A final solution to the above problem is not achieved.

SUMMARY OF THE INVENTION

In view of the foregoing, the invention has an object to provide a controller for automatic transmission that ensures a good followability to the target value of the feedback control regardless of the automatic transmission fluid (ATF) temperature of the automatic transmission during the feedback control of the engaging capacity of lockup clutch, thus preventing the engine hunting and the associated vibration of vehicle body.

According to an aspect of the invention for achieving the above object, a controller for automatic transmission including a torque converter (3) with a lockup clutch (35) disposed between a vehicle engine (1) and a transmission mechanism (2a) of an automatic transmission (2), and control means (5) for controlling an engaging state of the lockup clutch (35), further includes automatic transmission fluid temperature detecting means (200) for detecting an automatic transmission fluid temperature of the automatic transmission (2), the control means (5) including storage means (51) for storing a plurality of target slip ratios (53) of the lockup clutch (35); target slip ratio selecting means (5) for selecting one target slip ratio (53a) from the plural target slip ratios (53) based on running condition of a vehicle, and slip control means (5) for controlling the lockup clutch to operate with actual slip ratio thereof following the selected target slip ratio, in which the target slip ratio selecting means (5) selects one target slip ratio (53a) from the plural target slip ratios (53) based on the automatic transmission fluid temperature (TA) detected by the hydraulic fluid temperature detecting means (208).

When controlling the engaging state of the lockup clutch, the controller for automatic transmission according to the invention selects one target slip ratio from the plural target slip ratios based on the automatic transmission fluid (ATF) temperature detected by the hydraulic fluid temperature detecting means. Namely, the controller is adapted to switch the target slip ratios based on the automatic transmission fluid temperature in the feedback control of the lockup clutch. Thus, the controller performing the feedback control of the lockup clutch is capable of setting an optimum target value corresponding to the automatic transmission fluid temperature with due consideration of the friction characteristic of the lockup clutch. The controller can accomplish stable feedback control. Hence, the controller can ensure the good followability to the target value of the feedback control even when the automatic transmission fluid temperature is in a low temperature range, thus effectively preventing the engine hunting and the associated vibrations of vehicle body.

The above controller for automatic transmission may have an arrangement in which a plurality of threshold temperatures (T1 to T3) are defined for the automatic transmission fluid temperature (TA) used for selecting the target slip ratio (53a), and the target slip ratio selecting means (5) selects one target slip ratio (53a) from the plural target slip ratios (53) based on comparison between the automatic transmission fluid temperature detected by the hydraulic fluid temperature detecting means (208) and the plural threshold temperatures (T1 to T3).

According to this arrangement, a more appropriate target slip ratio responsive to the change in the automatic transmission fluid temperature can be selected by selecting one target slip ratio based on the comparison between the automatic transmission fluid temperature and the plural threshold temperatures. Therefore, the controller can ensure an even better followability to the target value of the feedback control.

The above controller for automatic transmission may have an arrangement in which as the higher automatic transmission fluid temperature (TA) is detected by the hydraulic fluid temperature detecting means (208), the target slip ratio selecting means (5) selects, from the plural target slip ratios (53), a target slip ratio for the tighter clutch position (53a), and as the lower automatic transmission fluid temperature (TA) is detected by the hydraulic fluid temperature detecting means (208), the target slip ratio selecting means (5) selects, from the plural target slip ratios (53), a target slip ratio for the looser clutch position (53a).

In a case where the detected temperature of the automatic transmission fluid is low, the friction modifier present in the automatic transmission fluid is not fully activated and hence, the slip ratio of the lockup clutch is set to a loose clutch position, so as to prevent an abrupt engagement of the lockup clutch. Thus, the lockup clutch is prevented from suffering an abrupt change in transmission torque and thence, is prevented from being lowered in the followability to the target value of the feedback control. On the other hand, in a case where the automatic transmission fluid temperature is high, the friction modifier is activated so that the lockup clutch is less likely to suffer the abrupt change in the transmission toque if the slip ratio of the lockup clutch is set to a tight clutch position. Accordingly, improved fuel economy can be achieved by setting the slip ratio of the lockup clutch to the tight clutch position.

Further, the above controller for automatic transmission may have an arrangement in which the storage means (51) stores a plurality of shift maps (52a) including target values of transmission gear ratio set by the transmission mechanism (2a), any one of the plural shift maps (52a) correlated with one of the plural target slip ratios respectively, in the selection of one target slip ratio from the plural target slip ratios based on the automatic transmission fluid temperature (TA) detected by the hydraulic fluid temperature detecting means (208), the shift map (52a) correlated with the one target slip ratio is selected, and the control means (5) controls gear shifting by the transmission mechanism (2a) based on the selected shift map.

According to this arrangement, when providing control to set the slip ratio of the lockup clutch 35 to the optimum value based on the automatic transmission fluid temperature of the automatic transmission, the controller selects the shift map correlated with the optimum slip ratio so that the controller can also control the transmission gear ratio of the transmission mechanism to an optimum value. The controller not only permits the lockup clutch to retain the good followability to the target value of feedback control even when the automatic transmission fluid temperature is in the low temperature range but also permits the transmission mechanism to be set to the optimum gear transmission ratio. Hence, the controller can improve the travelling performance of the vehicle.

It is noted that the above characters in parentheses represent, by way of example, reference characters of components of embodiments to be described hereinlater.

When performing the feedback control of the engaging capacity of the lockup clutch, the controller for vehicular automatic transmission according the invention can ensure the good followability to the target value of the feedback control regardless of the temperature of the automatic transmission fluid (ATF), thus effectively preventing the engine hunting and the associated vibrations of vehicle body.

DETAILED DESCRIPTION OF THE INVENTION

The embodiment of the invention will be described in detail as below with reference to the accompanying drawings.

First Embodiment

Figure 1:
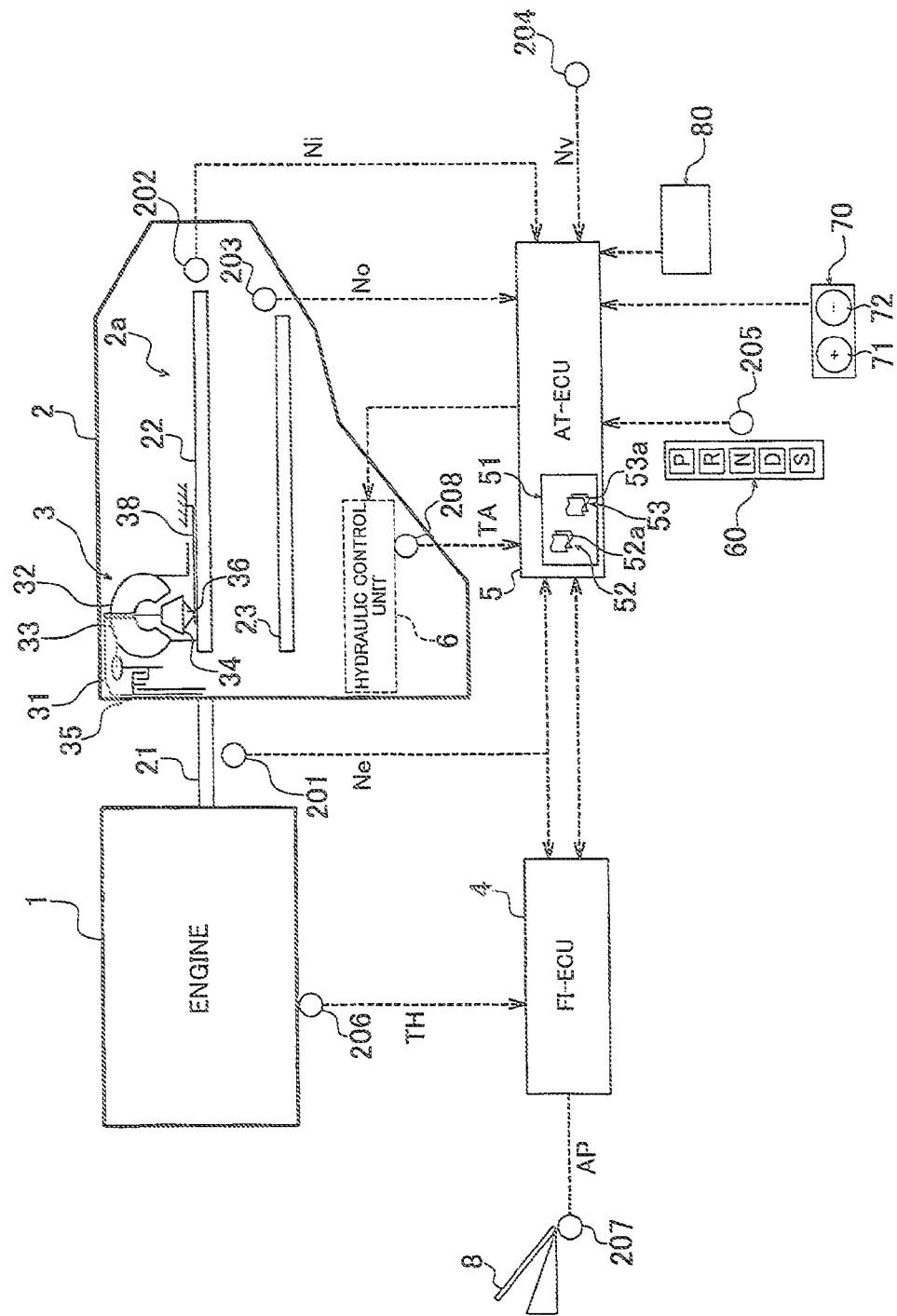
FIG. 1 is a schematic diagram showing a driving system of a vehicle equipped with a controller for automatic transmission according to one embodiment of the invention.

FIG. 1 is a schematic diagram showing a driving system of a vehicle equipped with a controller for automatic transmission according to a first embodiment of the invention. As shown in FIG. 1, the vehicle of the embodiment includes an engine 1, and an automatic transmission 2 coupled to the engine 1 via a hydraulic torque converter 3. The automatic transmission 3 includes a multi-speed transmission mechanism 2a. The vehicle further includes an FI-ECU 4 for controlling the engine 1, an AT-ECU (control means) 5 for controlling the automatic transmission 2 including the torque converter 3, and a hydraulic control unit 6 for controllably driving the torque converter 3 into rotation, for controlling the engagement of a lockup clutch 35 to be described hereinlater, and for controllably engaging/disengaging a plurality of friction engaging elements belonging to the multi-speed transmission mechanism 2a of the automatic transmission 2.

A rotation output from the engine 1 is applied to a crankshaft 21 (output shaft of the engine 1). The rotation of the crankshaft 21 is transmitted to a main shaft 22 of the automatic transmission 2 via the torque converter 3.

The torque converter 3 serves to transmit torque by means of a fluid (automatic transmission fluid). As shown in FIG. 1, the torque converter 3 includes: a front cover 31; a pump impeller 32 formed integrally with the front cover 31; a turbine runner 33 disposed between the front cover 31 and the pump impeller 32 in opposed relation to the pump impeller 32; and a stator vane 34 interposed between the pump impeller 32 and the turbine runner 33 and rotatably carried on a stator shaft (fixed shaft) 38 via a one-way clutch 36. As shown in FIG. 1, the crankshaft 21 is connected to the pump impeller 32 of the torque converter 3 via the front cover 31 while the turbine runner 33 is connected to the main shaft 22 (input shaft of the automatic transmission 2).

The lockup clutch 35 is disposed between the turbine runner 33 and the front cover 31. Under control, by the hydraulic control unit 6 responding to a command from the AT-ECU 5, the lockup clutch 35 implements lockup control in. Which the lockup clutch is pressed toward an inner side of the front cover 31 thereby to engage with clutch) the front cover 31 or is released from the pressure thereby to disengage from the front cover 31. ATF (Automatic Transmission Fluid) is sealed in a vessel defined by the front cover 31 and the pump impeller 32.

In a case where the lockup control is off, the pump impeller 32 and the turbine runner 33 are permitted to rotate relative to each other if, in this state, the rotation torque of the crankshaft 21 is transmitted to the pump impeller 32 via the front cover 31, the rotating pump impeller 32 produces a circulating flow of the ATF filling the vessel, the flow moving from the pump impeller 32 into the turbine runner 33 and then into the stator vane 34. Thus, the rotation torque of the pump impeller 32 is hydrodynamically transmitted to the turbine runner 33, as amplified to drive the main shaft 22. At this time, the stator vane 34 bears reaction force of the torque (hereinafter, referred to as "stator reaction force").

During the lockup control, on the other hand, the lockup clutch 35 is in engagement and hence, the turbine runner 33 is rotated integrally with the front cover 31 rather than rotated by way of the ATF flowing from the front cover 31 to the turbine runner 33, so that the rotation torque of the crankshaft 21 is directly transmitted to the main shaft 22. That is, the crankshaft 21 is mechanically coupled to (direct connection) the main shaft 22 via the lockup clutch 35 according to a lockup control amount.

The automatic transmission 2 includes, for example, the multi-speed transmission mechanism 2a having six forward gears and one reverse gear. The multi-speed transmission mechanism 2a is provided with a plurality of gear trains and a plurality of clutches (friction engaging elements) in correspondence to the number of gears. Each gear train consists of a pair of driving gear and driven gear. A specific illustration, such as skeleton diagram, of the structure of the transmission mechanism 2a is omitted because the transmission mechanism 2a does not constitute a feature of the invention. Those skilled in the art may adopt any of the known transmission structures as needed. The transmission mechanism 2a includes not only the transmission mechanism employing multiple gears for changing gear ratios but may also include a variable speed transmission mechanism, such as a belt-type continuously variable transmission adapted for continuously changing gear ratios, so long as such a transmission mechanism is electronically controlled to operate as if it had multiple speed gears for changing gear ratios.

The rotation torque of the main shaft 22 is transmitted to a counter shaft 23 via a clutch and a gear train thereof, gear trains of a secondary shaft and an idle shaft and the like which are not shown in FIG. 1. The rotation toque of the counter shaft 23 is transmitted to driving wheels of the vehicle via gear trains and differential mechanisms not shown in FIG. 1.

The hydraulic control unit 6 selectively engages or disengages (engaging operation) any one of the plural friction engaging elements (not shown) in the automatic transmission 2 by supplying the selected friction engaging element (clutch) with the automatic transmission fluid at a line pressure PL (hydraulic fluid pressure) thus shifting the automatic transmission into one of the plural speed gears.

Further, the hydraulic control unit 6 supplies the pump impeller 32 of the torque converter 3 with the automatic transmission fluid at a working hydraulic pressure thereby controlling torque converter slip ratio ETR which indicates how much of the rotary drive of the crankshaft 21 to be transmitted to the main shaft 22. The hydraulic control unit 6 also supplies an unillustrated oil chamber of the lockup clutch 35 with the automatic transmission fluid at the working hydraulic pressure, thereby controlling the lockup clutch 35 to engage (clutch) under a predetermined condition such as when the vehicle is cruising.

Further, the hydraulic control unit 6 also supplies the main shaft 22, the counter shaft 23 and the like with a lubricant at a sufficient pressure for lubricating the main shaft 22, the counter shaft 23 and the unillustrated secondary shaft and idle shaft. The secondary shaft and idle shaft are provided according to the number of gears and configuration of the automatic transmission 2.

crankshaft speed sensor 201 for detecting a revolution speed Ne of the crankshaft 21 (engine 1) is disposed in the vicinity of the crankshaft 21. Disposed in the vicinity of the main shaft 22 is a main shaft speed sensor 202 for detecting a revolution speed Ni of the main shaft 22 (revolution speed of the input shaft of the automatic transmission 2). Disposed in the vicinity of the counter shaft 23 is a counter shaft speed sensor 203 for detecting a revolution speed No of the counter shaft 23 (revolution speed of an output shaft of the automatic transmission 2). Revolution speed data acquired by the revolution speed sensors 201 to 203 are outputted to the AT-ECU 5. The vehicle is also provided with a vehicle speed sensor 204 for detecting a vehicle speed Nv. Vehicle speed data acquired by the vehicle speed sensor 204 is outputted to the AT-ECU 5. The vehicle is further provided with a throttle opening sensor 206 for detecting a throttle opening TH of the engine 1. Throttle opening data acquired by the throttle opening sensor 206 is outputted to the FI-ECU 4. Although not shown in the figure, the vehicle is also provided with an intake-air temperature sensor for detecting a temperature of air (intake air temperature) supplied to the engine 1, a flow sensor for detecting an air flow and the like.

An accelerator pedal opening sensor 207 for detecting an opening AP (accelerator pedal opening) of an accelerator pedal 8 is disposed in the vicinity of the accelerator pedal 8. Accelerator pedal opening data acquired by the accelerator pedal opening sensor 207 is outputted to the FI-EOU 4. The vehicle is also provided with an air conditioning unit 80, operation information of which is outputted to the AT-ECU 5. The air conditioning unit 80 may be an electric air conditioning unit equipped with an electric compressor or an air conditioning unit equipped with a mechanical compressor driven by rotation torque transmitted from a rotary shaft (the main shaft 22 or the counter shaft 23) of the automatic transmission 2.

A fluid temperature sensor 208 for detecting a temperature TA of the automatic transmission fluid (ATE) of the automatic transmission 2 (hydraulic control unit 6) is disposed in the vicinity of an unillustrated oil tank in, the hydraulic control unit 6. ATF temperature (fluid temperature) data acquired by the fluid temperature sensor 208 is outputted to the AT-ECU 5.

The vehicle of the embodiment includes a gearshift device 60 operated by a driver via a shift lever, and a paddle switch 70 disposed in the vicinity of an unillustrated steering wheel.

As shown in FIG. 1, the positions of the shift lever (not shown) of the gearshift device 60 includes, for example, P (parking) R (reverse travel), N (neutral), D (forward travel in automatic transmission mode (normal mode)) S (forward, travel in sport mode) and the like. A shift lever position sensor 205 is disposed in the vicinity of the gearshift device 60. The shift lever position sensor 205 detects the position of the shift lever manipulated by the driver.

The paddle switch 70 consists of a minus (−) paddle switch 71 for downshift command in a manual transmission mode and a plus (+) paddle switch 72 for upshift command in the manual transmission mode. Operation signals from these paddle switches 71, 72 are outputted to the AT-ECU 5 for shifting up or shifting down the automatic transmission 2 according to the running condition of the vehicle. According to the embodiment, the vehicle is switched from the automatic transmission mode to the manual transmission mode by the driver manipulating either one of the paddle switches 71, 72 when the vehicle is set in the automatic transmission mode with the shift lever positioned in a "D" range or "S" range.

The FI-ECU 4 controls the output from the engine 1 or the revolution speed Ne of the engine 1 based on the detection data inputted from the sensors 202 to 208 and the various data items inputted from the AT-ECU 5. Based on the detection data inputted from the sensors 202 to 208 and the various data items inputted from the FI-ECU 4, the AT-ECU 5 controls a group of valves in the hydraulic control unit 6 so as to bring any one of the plural friction engaging elements (clutches) into engagement. Furthermore, the AT-ECU 5 controls the engagement of the lockup clutch 35 by adjusting the lockup control amount in a predetermined operating range via the hydraulic control unit 6.

Figure 2:
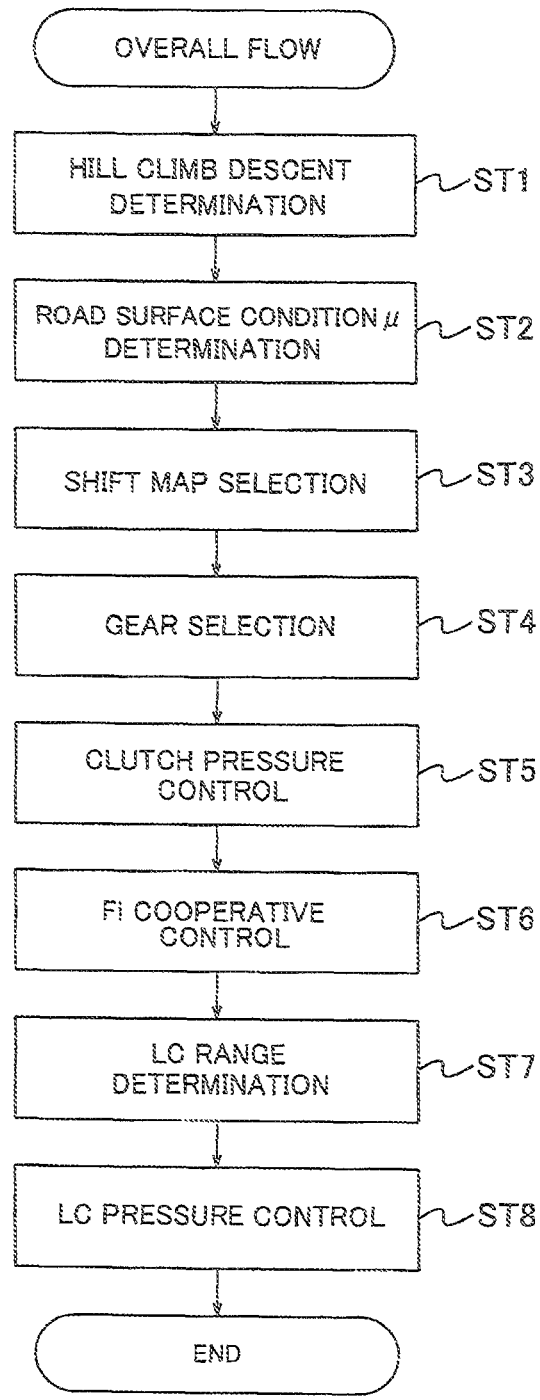
FIG. 2 is a flow chart showing the overall flow of a gear selection sequence.

Next, description is made on a gear selection procedure taken by the AT-ECU 5 of the automatic transmission 2 according to the embodiment. FIG. 2 is a flow chart showing the overall flow of gear selection sequence performed by the AT-ECU 5. The overall flow is performed at predetermined time intervals while the vehicle is travelling.

In the control of gear selection, the AT-ECU 5 first performs hill climb/descent determination (Step ST1). Specifically, the AT-ECU 5 refers to the vehicle speed Nv and engine load (the throttle opening TH detected by the throttle opening sensor 206) to identify a normative acceleration (estimated acceleration) on a map stored in a memory 51. Then, the AT-ECU 5 estimates an uphill/downhill grade (gradient) according to a difference between the identified normative acceleration and an actual acceleration.

Subsequently, the AT-ECU 5 performs road surface condition μ determination (Step ST2). Specifically, the AT-ECU 5 determines a road surface condition μ (road surface friction coefficient) based on the vehicle speed Nv detected by the vehicle speed sensor 204, wheel speed Nw of each road wheel detected by an unillustrated wheel speed sensor, the accelerator pedal opening AP detected by the accelerator pedal opening sensor 207, the shift lever position detected by the shift lever position sensor 205, the up-hill/downhill grade (estimated gradient) estimated in Step ST1-1 and the like.

Next, the AT-ECU 5 performs shift map selection (Step ST3). Referring to a gear in which the automatic transmission 2 is currently set, the above-described up-hill/downhill grade, the acceleration pedal operation, brake application detected by an unillustrated brake sensor and the like, the AT-ECU 5 selects, from a group 52 of plural shift maps stored in the memory 51 thereof, one shift map 52a suitable for the road on which the vehicle is travelling.

Subsequently, the AT-ECU 5 performs gear selection (Step ST4). The AT-ECU 5 selects a final gear by referring to the shift map 52a selected in Steps ST1-3 and taking into consideration the manipulation of the shift, lever 70, forbidden conditions for gear shifting and the like.

Subsequently, the AT-ECU 5 performs clutch pressure control (Step ST5). Specifically, the AT-ECU 5 controls the hydraulic control unit 6 in a manner such that the hydraulic control unit 6 controls the clutch pressure of the gear selected in Step ST1-4 based on the selected gear thereby driving the final gear into engagement.

Next, the AT-ECU 5 performs Fi cooperative control (Step ST6). When the final gear is set, the AT-ECU 5 controls input torque in cooperation with the control of the engine 1.

Subsequently, the AT-ECU 5 performs LC range determination (Step ST7). The AT-ECU 5 selects an LC (lockup) control for the lockup clutch 35 of the torque converter 3 based on the up-hill/downhill grade (estimated gradient) estimated in Step ST1-1, the final gear selected in Steps ST1-4, the acceleration pedal operation, brake application and the like. The LC control is selected as follows. Whether the vehicle is within a range where the lockup is applicable is determined based on the accelerator pedal opening AP detected by the accelerator pedal opening sensor 207 (or the throttle opening TH detected by the throttle opening sensor 206) and the vehicle speed Nv detected by the vehicle speed sensor 204. According to the determination thus made, the AT-ECU 5 decides to provide OFF control of the lockup clutch 35, to provide the slip control (acceleration or deceleration), or to provide a tight clutch control (ON control of the lockup clutch 35 (fully engaging control)).

Lastly, the AT-ECU 5 performs LC pressure control (Step ST-8). Based on the LC control selected in. Steps ST1-7, the AT-ECU 5 controls the pressure of the hydraulic fluid supplied to the lockup clutch 35 which is set by the hydraulic control unit 6. When completing the LC pressure control, the AT-ECU 5 terminates the overall flow of the gear selection sequence and stands by for the next processing.

In the above-described LC pressure control (Step ST6), the controller of the embodiment switches target values of the LC feedback control (target differential rotation or target slip ratio of the lockup clutch 35) according to a variety of vehicle conditions including the running condition and the like and decides a hydraulic pressure required for the LC control. The term "hydraulic pressure required for to control" used herein means control, oil, pressure as a converted value of IC transmission torque calculated from the target differential rotation or target slip ratio, the engine torque and the torque absorbed by tor-con pump.

In order to decide the above hydraulic pressure required for LC control, the controller selects one target slip ratio map 53a from the slip ratio mad group 53 including a plurality of target slip ratio maps stored in the memory 51 of the AT-ECU 5. The target slip ratio map 53a is selected based on data indicative of the vehicle conditions which include the selected gear, the accelerator pedal opening and the like. The controller controls the actual slip ratio of the lockup clutch 35 to follow the slip ratio shown on the target slip ratio map 53a thus selected. A detailed description is made as below on a procedure for selecting the target slip ratio map.

Figure 3:
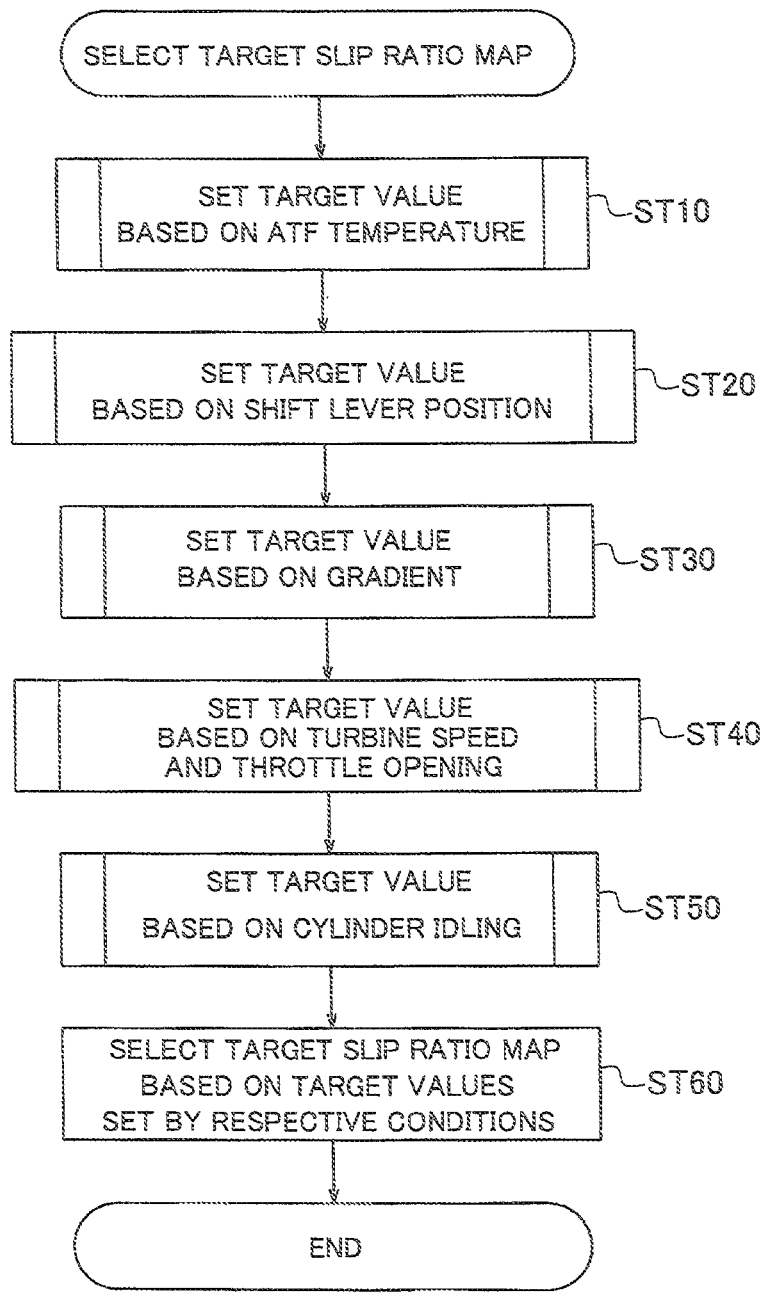
FIG. 3 is a flow chart (main flow) showing the steps of a procedure for selecting a target slip ratio map.
Figure 4:
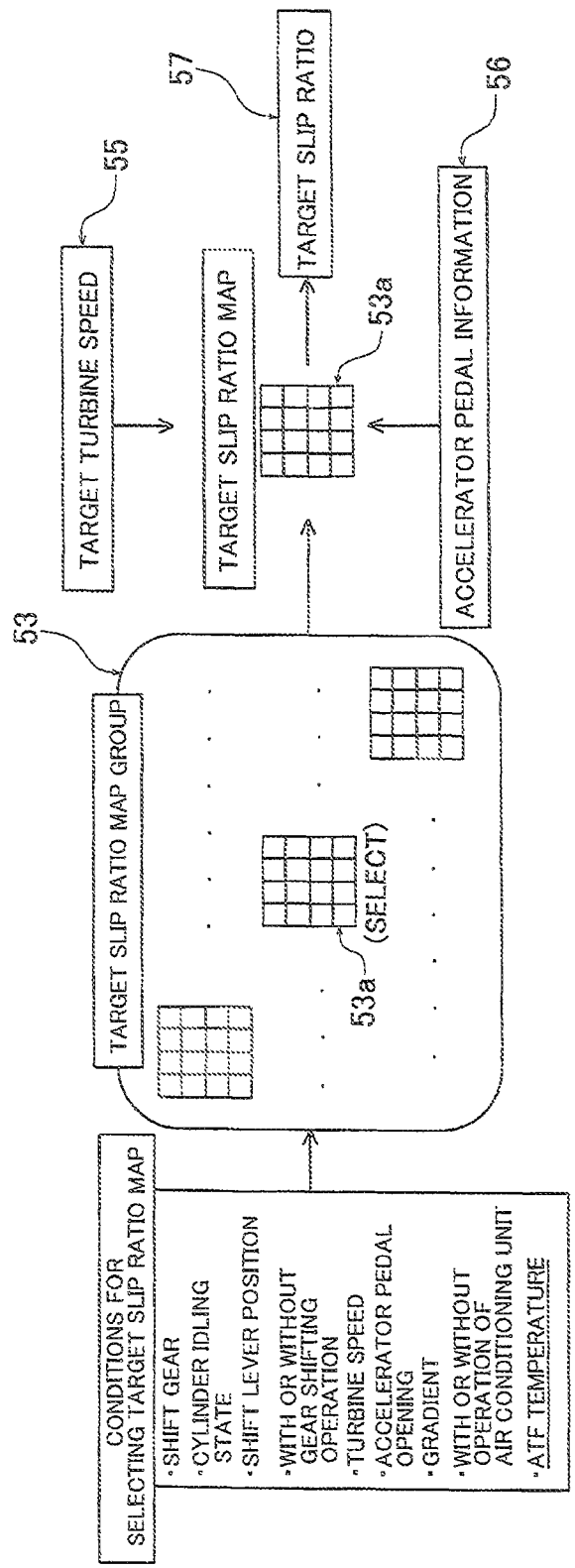
FIG. 4 is a diagram schematically showing the procedure for selecting the target slip ratio map.

FIG. 3 is a flow chart (main flow) showing the steps of the procedure for selecting the target slip ratio map. FIG. 4 is a diagram schematically showing the procedure for selecting the target slip ratio map. In the selection of the target slip ratio map, a target value for selecting the target slip ratio map is first set based on the ATF temperature TA (ST10). Subsequently, a target value for selecting the target slip ratio map is set based on the shift lever position (ST20). A target value for selecting the target slip ratio map is set based on the gradient (ST30). A target value for selecting the target slip ratio map is set based on turbine speed and throttle opening (ST40). A target value for selecting the target slip ratio map is set based on cylinder idling of the engine 1 (ST50). Based on the target values so set based on the respective conditions of Steps ST10 to ST50, one target slip ratio map 53a is selected from the slip ratio map group 53 stored in the memory 51 (Step ST60).

As shown in FIG. 4, therefore, the shift gear set by the transmission mechanism 2a, the cylinder idling state of the engine 1 (the number of idled cylinders), the shift lever position of the gearshift device 60, with or without gear shifting operation, the turbine speed of the torque converter 3, the accelerator pedal opening AP, the running gradient of the vehicle, with or without operation of the air conditioning unit 80 and the ATF temperature TA are set as the conditions for selecting (switching) the target slip ratio map. In the controller of the embodiment, the conditions for selecting (switching) the target slip ratio map include the ATF temperature TA. Based on these conditions, one target slip ratio map 53a is selected from the slip ratio map group 53. Subsequently, a final target slip ratio 57 is decided by retrieving slip ratios on the selected target slip ratio map 53a based on a target turbine speed 55 and an accelerator pedal condition (accelerator pedal opening) 56.

Figure 5:
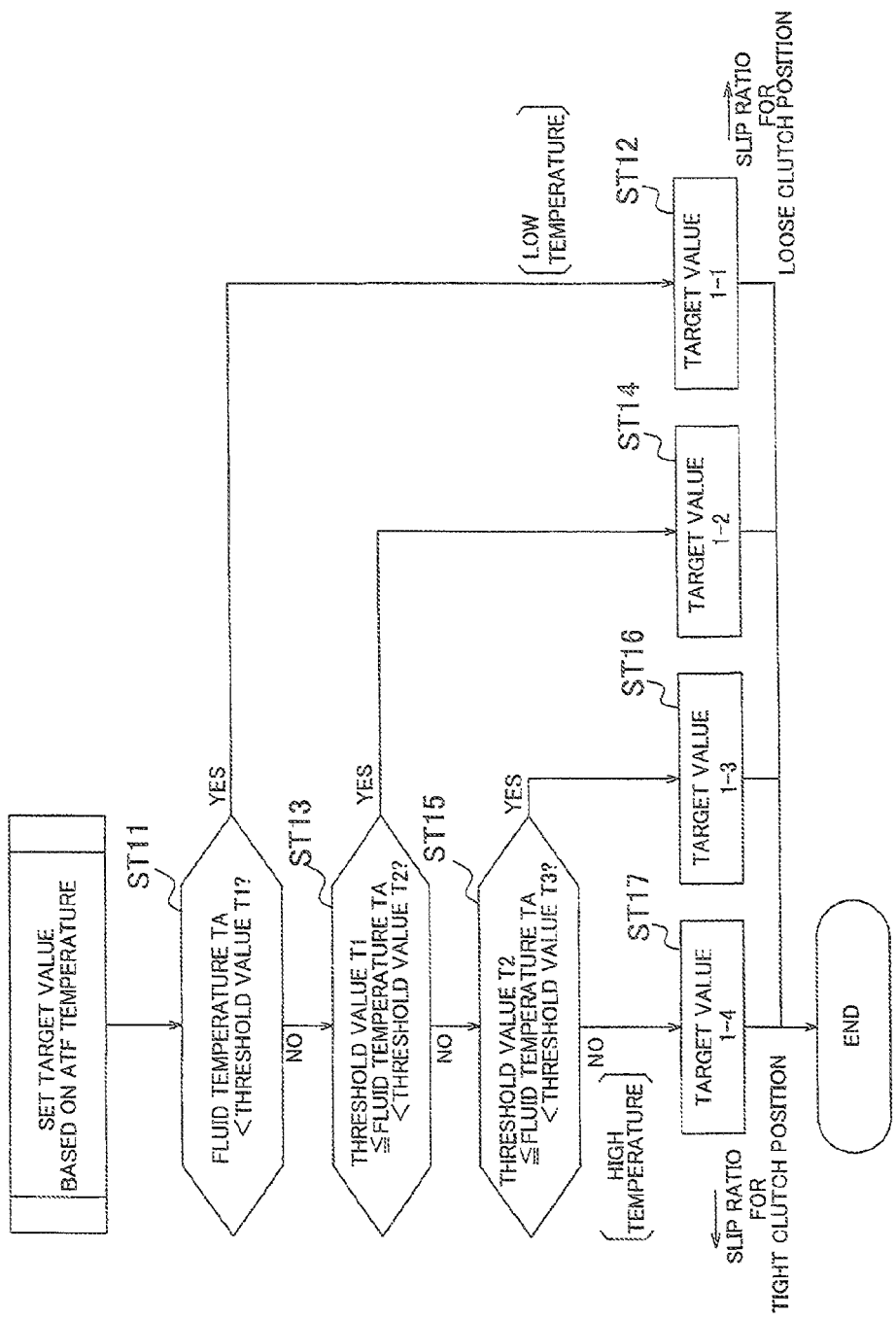
FIG. 5 is a flow chart (subroutine) showing the steps of a procedure for setting a target value for selecting the target slip ratio map based on ATF temperature.

Each of the steps of the flow chart of FIG. 3 or each procedure for setting the target value for selecting the target slip ratio map is described in order. FIG. 5 is a flow chart (subroutine) showing the steps of a procedure for setting the target value based on the ATF temperature. It is noted that the following first to third threshold temperatures T1 to T3 has a relation T1<T2<T3. In the procedure for setting the target value based on the ATF temperature, determination is first made as to whether the ATF temperature TA is less than the first threshold temperature T1 or not (TA<T1) (Stan ST11). If it is determined that the ATF temperature TA is less than the first threshold temperature T1 (TA<T1) (YES), the target value for selecting the target slip ratio map is set to a "target value 1-1" (Step ST12). On the other hand, if the ATF temperature TA is equal to or more than the first threshold temperature T1 (TA≧T1) (NO), further determination is made as to whether or not the ATF temperature TA is equal to or more than the first threshold temperature T1 and is less than the second threshold temperature T2 (T1≦TA<T2) (Step T13). If it is determined that the ATF temperature TA is equal to or more than the first threshold temperature T1 and is less than the second threshold temperature T2 (T1≦TA<T2) (YES), the target value for selecting the target slip ratio map is set to a "target value 1-2" (Step ST14). On the other hand, if the ATF temperature TA is not in the range of equal to or more than the first threshold temperature T1 and less than the second threshold temperature T2 (NO) further determination is made as to whether or not the ATF temperature TA is equal to or more than the second threshold temperature 12 and is less than the third threshold temperature T3 (T2≦TA<T3) (Step ST15). If it is determined that the ATF temperature TA is equal to or more than the second threshold temperature T2 and is less than the third threshold temperature T3 (T2≦TA<T3) (YES), the target value for selecting the target slip ratio map is set to a "target value 1-3" (Step ST16). On the other hand, if the ATF temperature TA is not in the range of equal to or more than the second threshold temperature 12 and less than the third threshold temperature T3 (NO), the target value for selecting the target slip ratio map is set to a "target value 1-4" (Step ST17). Of the target values 1-1 to 1-4, the target value 1-1 represents a target slip ratio for the loosest clutch position while the target value 1-4 represents a target slip ratio for the tightest clutch position.

Figure 6A:
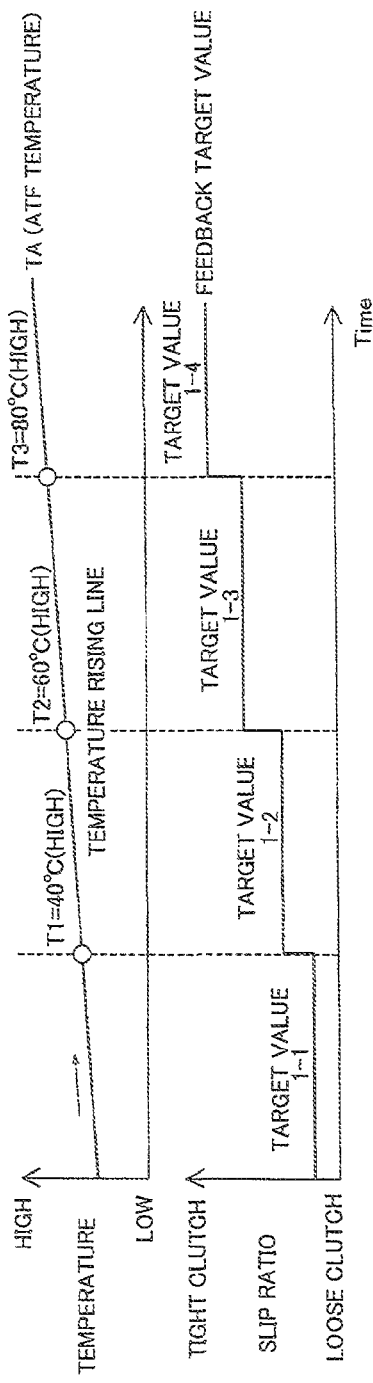
FIG. 6A is a timing chart showing a relation between the ATF temperature varying on a rising line and the target value of feedback control.
Figure 6B:
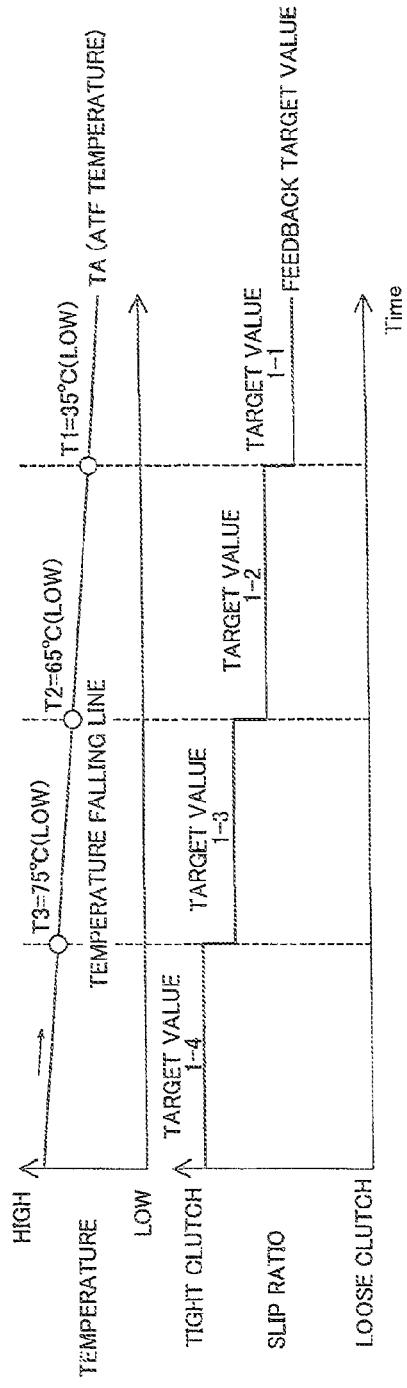
FIG. 6B is a timing chart showing a relation between the ATF temperature varying on a falling line and the target value of feedback control.

FIG. 6A and FIG. 6B are timing charts each showing a relation between the ATF temperature TA and the above-described target values 1-1 to 1-4 for selecting the target slip ratio map. FIG. 6A is the timing chart showing a relation between the increasing fluid temperature and the target value. FIG. 6B is the timing chart showing a relation between the decreasing fluid temperature and the target value. In the timing charts, the first to third threshold temperatures T1 to T3 are defined as, for example: T1=40° C. (temperature rising line) or 35° C. (temperature falling line); T2=60° C. (temperature rising line) or 65° C. (temperature falling line); and T3=80° C. (temperature rising line) or 75° C. (temperature falling line). It is noted here that each of the threshold temperatures is defined to have different values on the temperature rising line and the temperature falling line in order to prevent the target value of the feedback control from causing hunting when the detected ATF temperature TA finely fluctuates.

In a case where the ATF temperature TA is increasing, as shown in FIG. 6A, the target value for selecting the target slip ratio map is set to the "target value 1-1" when the ATF temperature TA is less than the first threshold temperature T1 (=40° C.). When the ATF temperature TA is in the range of equal to or more than the first threshold temperature T1 (=40° C.) and less than the second threshold temperature T2 (=60° C.), the target value is set to the "target value 1-2". When the ATF temperature TA is in the range of equal to or more than the second threshold temperature T2 (–60° C.) and less than the third threshold temperature T3 (=80° C.), the target value is set to the "target value 1-3". When the ATF temperature TA is equal to or more than the third threshold temperature T3 (=80° C.), the target value is set to the "target value 1-4".

On the other hand, in a case where the ATF temperature is decreasing, as shown in FIG. 6B, the target value for selecting the target slip ratio map is set to the "target value 1-4" when the ATF temperature TA is equal to or more than the third threshold temperature T3 (=75° C.). When the ATF temperature TA is in the range of equal to or more than the second threshold temperature T2 (=65° C.) and less than the third threshold temperature T3 (=75° C.) the target value is set to the "target value 1-3". When the ATF temperature TA is in the range of equal to or more than the first threshold temperature T1 (=35° C.) and less than the second threshold temperature T2 (=65° C.), the target value is set to the "target value 1-2". When the ATF temperature TA is less than the first threshold temperature T1 (=35° C.), the target value is set to the "target value 1-1".

Figure 7:
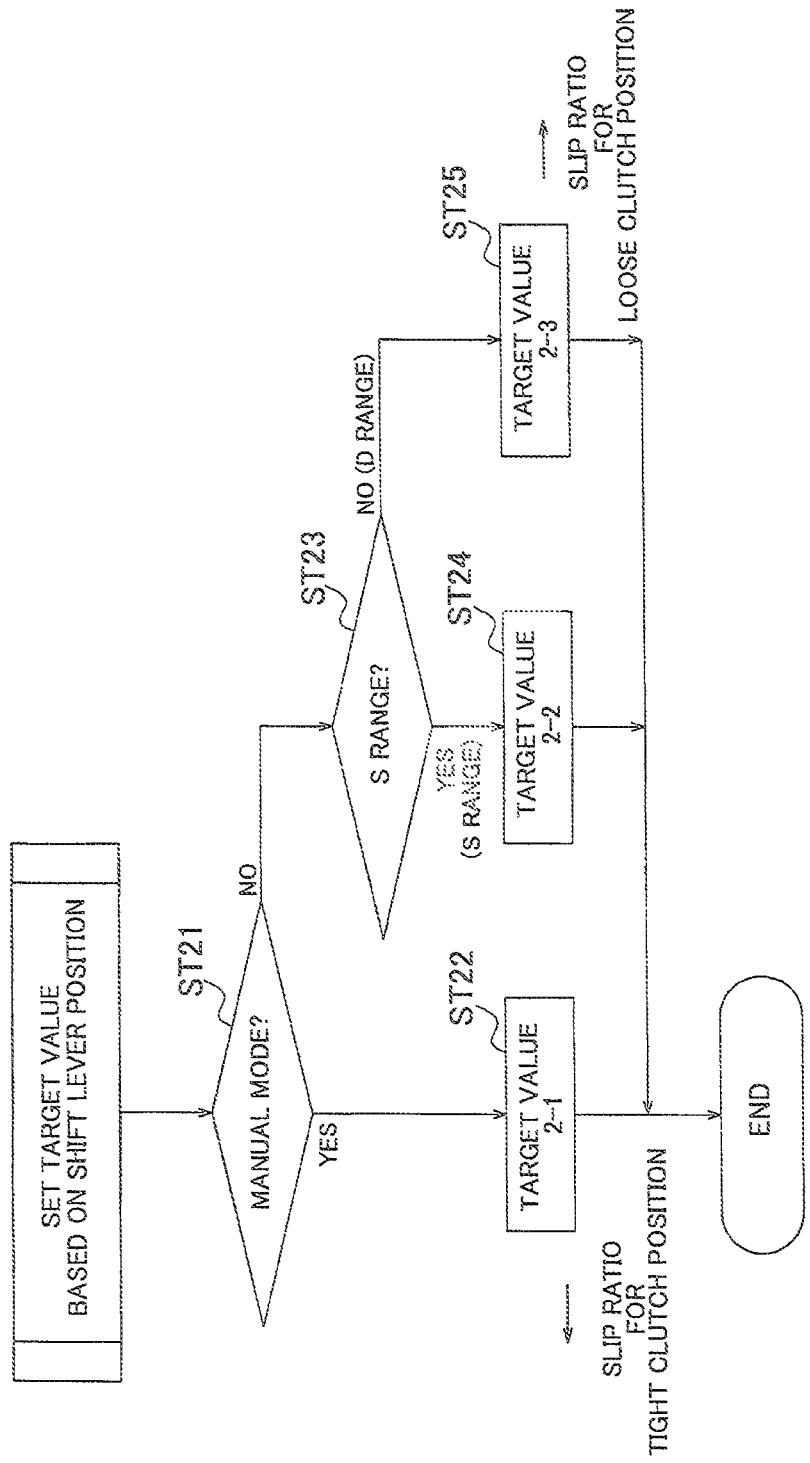
FIG. 7 is a flow chart (subroutine) showing the steps of a procedure for setting the target value for selecting the target slip ratio map based on shift lever position.

FIG. 7 is a flow chart (subroutine) showing the steps of the procedure for setting the target value for selecting the target slip ratio map based on the shift lever position (Step ST20). In the procedure for setting the target value based on the shift lever position, determination is first made as to whether the present gear shift mode is a manual, mode or not (Step ST21). If it is determined that the gear shift is the manual mode (YES), the target value for selecting the target slip ration map is set to a "target value 2-1" (Step ST22). If the gear shift is not the manual mode (NO), on the other hand, further determination is made as to whether the shift lever position is in an S range or not (Step ST23). If it is determined that the shift lever position is in the S range (YES), the target value for selecting the target slip ratio map is set to a "target value 2-2" (Step ST24). If the shift lever position is not in the S range (NO) namely is in a D range, on the other hand, the target value for the feedback control is set to a "target value 2-3" (Step ST25). According to comparison among these target values 2-1 to 2-3, the target value 2-1 represents the slip ratio for the tightest clutch position while the target value 2-3 represents the slip ratio for the loosest clutch position.

Figure 8:
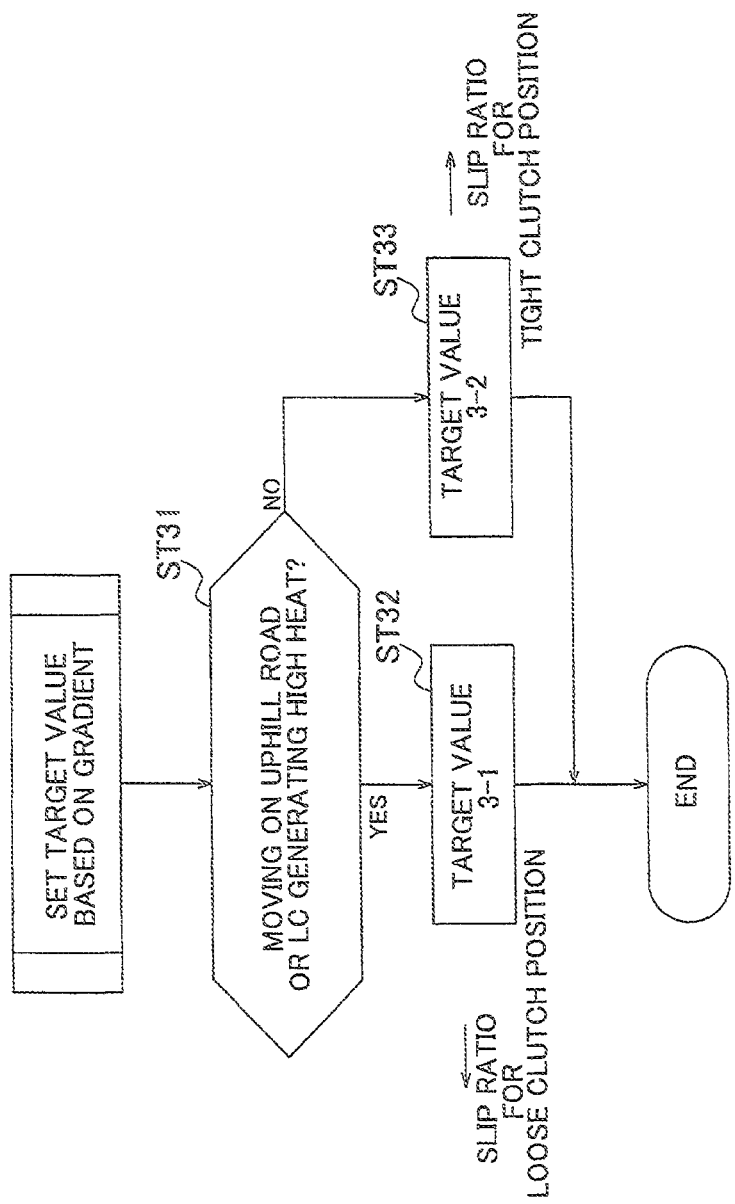
FIG. 8 is a flow chart (subroutine) showing the steps of a procedure for setting the target value for selecting the target slip redo man based on gradient.

FIG. 8 is a flow chart (subroutine) showing the steps of the procedure for setting the target value for selecting the target slip ratio map based on the gradient (Step ST30). In the procedure for setting the target value based on the gradient, determination is first made as to whether or not the vehicle is moving on an uphill road or whether or not the heat value of the lockup clutch 35 is high (Step ST31). The heat value of the lockup clutch 35 can be calculated (estimated) from the differential rotation of the torque converter 3 or the like. If it is determined that the vehicle is moving on the uphill road or that the heat value of the lockup clutch 35 is high (YES), the target value for selecting the target slip ratio map is set to a "target value 3-1" (Step ST32). On the other hand, if it is determined that the vehicle is not moving on the uphill road and that the heat value of the lockup clutch 35 is not high (NO), the target value is set to a "target value 3-2" (Step ST33). Comparison between the target value 3-1 and the target value 3-2 indicates that the target value 3-2 represents a slip ratio for tighter clutch position than the target value 3-1.

Figure 9:
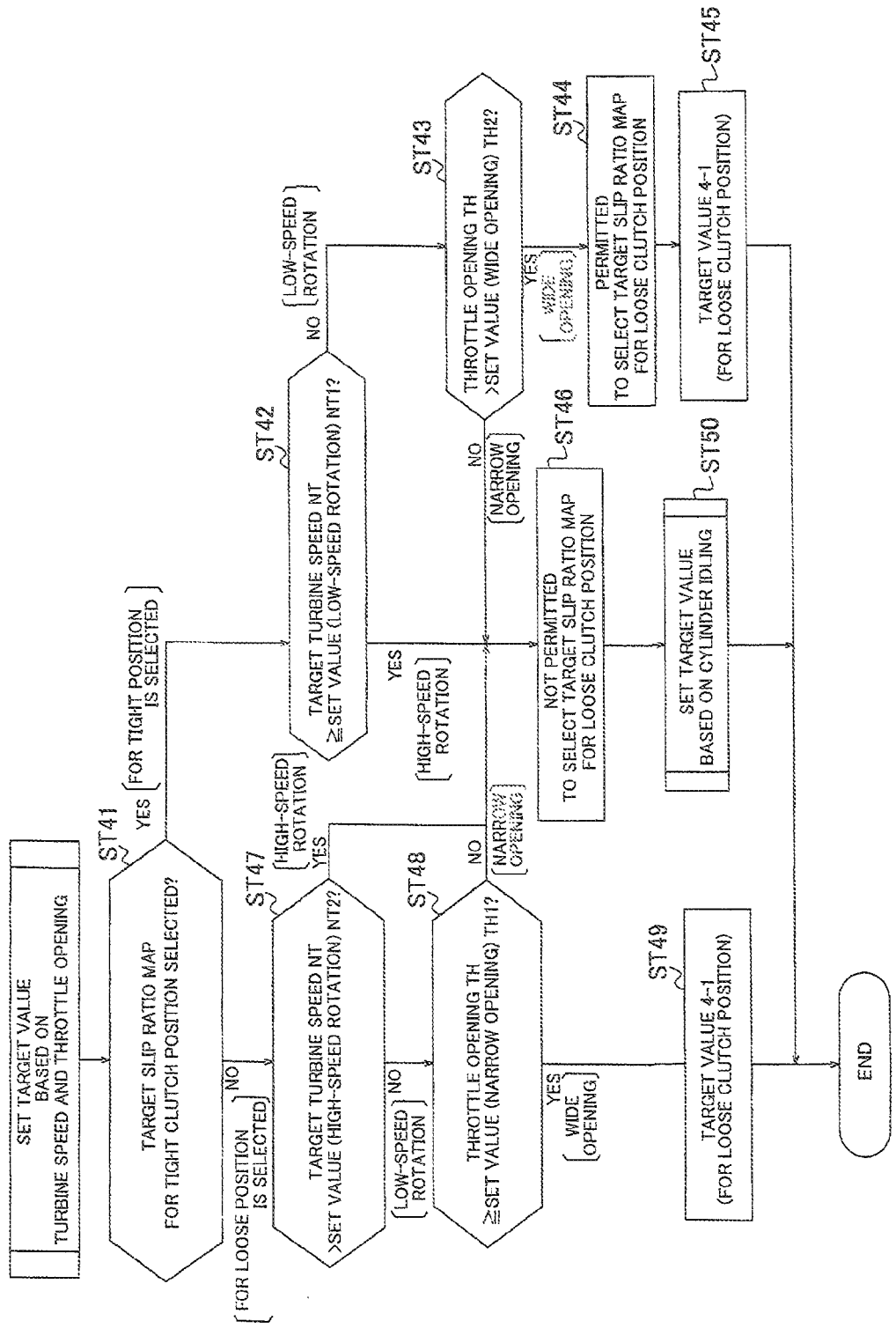
FIG. 9 is a flow chart (subroutine) showing the steps of a procedure for setting the target value for selecting the target slip ratio map based on turbine speed and throttle opening.

FIG. 9 is a flow chart (subroutine) showing the steps of the procedure for setting the target value for selecting the target slip ratio map based on the turbine speed and the throttle opening (Step ST40). In the procedure for setting the target value based on the turbine speed and the throttle opening, determination is made as to whether a target slip ratio map for tight clutch position is currently selected or not (Step ST41). If it is determined that the target slip ratio map for tight clutch position is selected (YES), then determination is made as to whether or not a target turbine speed NT (=target revolution speed of the main shaft 22 of the automatic transmission 2) is equal to or more than a previously set value NT1 of the turbine speed (low-speed rotation). (Step ST42). If the target turbine speed NT does not exceed the set value NT1 (NO) or the turbine is in a low-speed rotation, further determination is made as to whether or not, the throttle opening TH is more than a previously set value TH2 (wide opening) of the throttle opening (Step ST43). If it is determined that the throttle opening TH is more than the set value TH2 (wide opening) (YES) it is permitted to select a target slip ratio map for loose clutch position as the target slip ratio map (Step ST44). The target value for selecting the target slip ratio map is set to a "target value 4-1 (target value for loose clutch position" (Step ST45). On the other hand, if it is determined in Step ST42 that the target turbine speed NT is equal to or more than the set value NT1 (low-speed rotation) (YES), it is not permitted to select the target slip ratio map for loose clutch position as the target slip ratio map (Step ST46). This step is followed by setting the target value based on the cylinder idling (Step. ST50). A detailed description on Step ST50 will be made hereinlater. In a case where it is determined in the previous Step ST43 that the throttle opening TH is equal to or less than the set value TH2 (wide opening) (NO), as well, it is not permitted to select the target slip ratio map for loose clutch position as the target slip ratio, map (Step ST46). This step is followed by setting the target value based on the cylinder idling (Step ST50).

If it is determined in the previous Step ST41 that the target slip ratio map not for tight clutch position but for loose clutch position is selected (NO), determination is made as to whether or not the target turbine speed NT is more than a previously set value NT2 (high-speed rotation) of the turbine speed (Step ST47). If the target turbine speed NT is more than the set value NT2 (high-speed rotation) (YES), namely the turbine is in high-speed rotation, it is not permitted to select the target slip ratio map for loose clutch position as the target slip ratio map (Step ST46). This step is followed by setting the target value based on the cylinder idling (Step ST50). On the other hand, if the target turbine speed. NT is equal to or less than the set value TH2 (high-speed rotation) (NO), namely the turbine is in low-speed rotation, further determination is made as to whether or not the throttle opening TH is equal to or more than a previously set value TH1 (narrow opening) of the throttle opening (Step ST48). If it is determined that the throttle opening TH1 is less than the set value TH1 (narrow opening) (NO), namely the throttle opening is narrow, it is not permitted to select the target slip ratio map for loose clutch position as the target slip ratio map (Step ST46). This step is followed by setting the target value based on the cylinder idling (Step ST50). On the other hand, if the throttle opening TH is equal to or more than the set value TH1 (wide opening) (YES), namely the throttle opening is wide, the target value for selecting the target slip ratio map is set to the "target value 4-1 (target value for loose clutch position)" (Step ST49). When the switching conditions are determined based on the turbine speed and the throttle opening, either of the slip ratio map for loose clutch position and the slip ratio map for tight clutch position is selected as the target slip ratio map based on the throttle opening (accelerator pedal opening) and the turbine speed.

Figure 10:
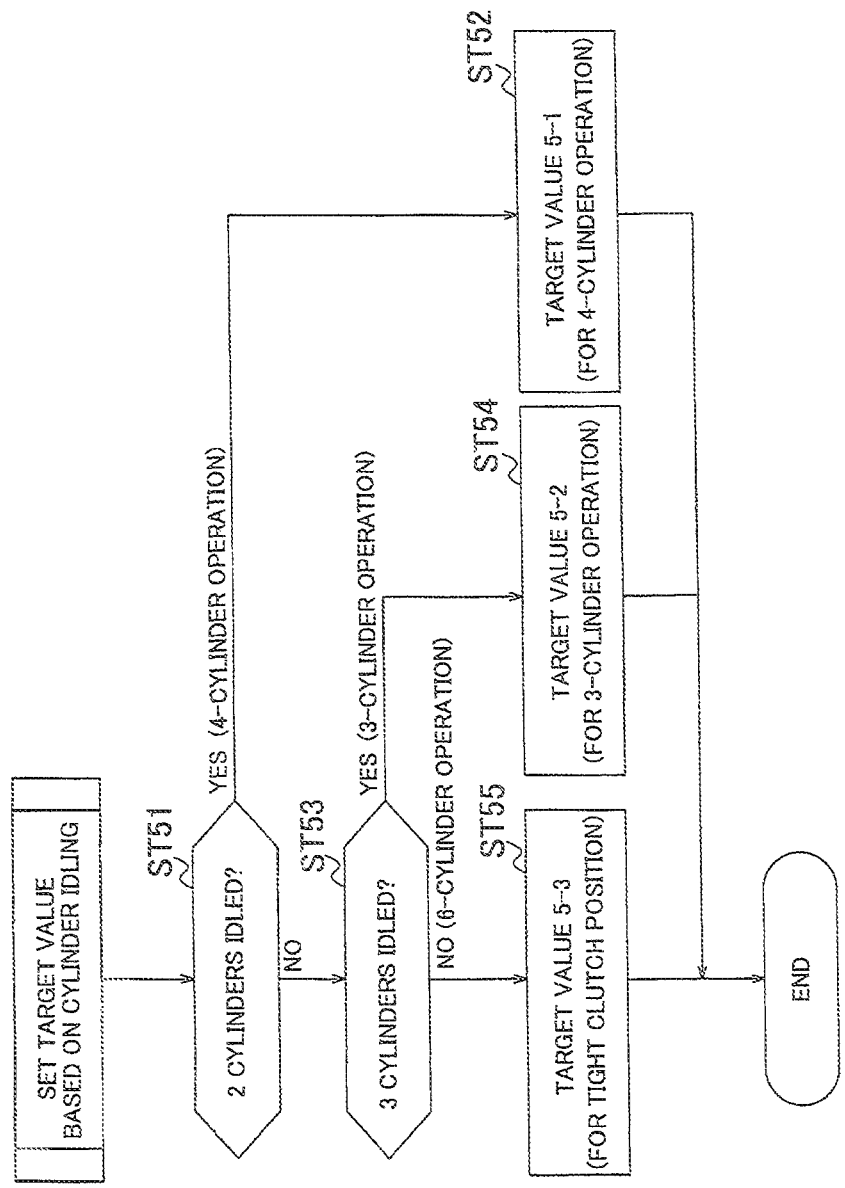
FIG. 10 is a flow chart (subroutine) showing the steps of a procedure for setting the target value for selecting the target slip ratio map based on cylinder idling.

FIG. 10 is a flow chart (subroutine) showing the steps of a procedure for setting a target value for selecting the target slip ratio map based on cylinder idling, in the procedure for setting the target value based on the cylinder idling, whether two cylinders are idled or not is determined to identify a cylinder idling state of the engine 1 (Step ST51). If it is determined, that the two cylinders are idled (YES), namely the vehicle is in four-cylinder operation, the target value for selecting the target slip ratio map is set to a "target value 5-1 (target value for four-cylinder operation)" (Step ST52). On the other hand, if it is determined that the two cylinders are not idled (NO), further determination is made as to whether three cylinders are idled or not (Step ST53). If it is determined that three cylinders are idled (YES), namely the vehicle is in three-cylinder operation, the target value for selecting the target slip ratio map is set to a "target value 5-2 (target value for three-cylinder operation)" (Step ST54). If three cylinders are not idled (NO) namely the vehicle is in full-cylinder (six-cylinder) operation, the target value for selecting the target slip ratio map is set to a "target value 5-3 (target value for tight clutch position)" (Step ST55). When the switching condition is determined based on the cylinder idling state, either of the slip ratio map for loose clutch position and the slip ratio map for tight clutch position is selected as the target slip ratio map based on the cylinder idling state of the engine 1.

After the target values are set based on the conditions in the above-described Steps ST10 to Step ST50, respectively, Step ST60 of the main flow shown in FIG. 3 is performed to select one target slip ratio map 53a from the target slip ratio map group 53 based on the target values so set based on the respective conditions. Specifically, one target value selected from the target values 1-1 to 1-4 based on the ATF temperature in Step ST10, one target value selected from the target values 2-1 to 2-3 based on the shift lever position in Step ST20, one target value selected from the target values 3-1 and 3-2 based on the gradient in Step ST30, the target value 4-1 selected based on the turbine speed and the throttle opening in Step ST40, and one target value selected from the target values 5-1 to 5-3 based on the cylinder idling in Step ST50 are reviewed respectively so as to determine which of the loose clutch position and the tight clutch position the target slip ratio is directed to. Thus, one slip ratio map 53a is selected based on this determination. The slip control of the lockup clutch 35 is performed based on the one slip ratio map 53a thus selected.

As described above, the controller for the automatic transmission 2 of the embodiment selects one target slip ratio from the plural target slip ratios based the ATF temperature detected by the fluid temperature sensor 208 when controlling the engaging state of the lockup clutch 35. Namely, the controller is designed to switch the target slip ratios based on the ATF temperature during the feedback control of the lockup clutch 35. Thus, the controller performing the feedback control of the engaging capacity of the lockup clutch 35 is adapted to provide the control based on the optimum target value that is set in the light of friction characteristic of the lockup clutch 35 corresponding to the fluid temperature. The controller can accomplish stable feedback control. Therefore, the controller can ensure good followability to the target value of the feedback control even when the ATF temperature is in a low temperature range, thus effectively suppressing the engine hunting and the associated vehicle body vibrations. In contrast to the feedback control of the embodiment, the conventional, feedback control of the engaging capacity of the lockup clutch 35 does not switch the target values (e.g., target slip ratios) of the feedback control according to the ATF temperature. Out of the steps shown in FIG. 3, the processing of Step ST10 is not performed in the conventional feedback control.

According to the control of the embodiment, a plurality of threshold temperatures T1 to T3 are defined for the ATF temperature used for selecting the target slip ratio. As shown in FIG. 6, one target slip ratio map is selected from the plural target slip ratio maps by comparing the ATF temperature TA detected, by the fluid temperature sensor 208 with the plural threshold temperatures T1 to T3.

A more suitable target slip ratio responsive to the varying ATF temperature can be selected by comparing the detected ATF temperature with the plural threshold temperatures T1 to T3. Therefore, the controller of the embodiment can ensure a more excellent followability to the target value of the feedback control.

The control of the embodiment is provided in a manner such that as the higher ATF temperature TA is detected by the fluid temperature sensor 208, a target slip ratio for the tighter clutch position is selected from the plural target slip ratios, and that as the lower ATF temperature TA is detected by the fluid temperature sensor 203, a target slip ratio for the looser clutch position is selected from the plural target slip ratios.

In a case where the detected ATF temperature TA is low, the friction modifier present in the ATF is not fully activated. Therefore, the slip ratio of the lockup clutch 35 is set to the loose clutch position so as to prevent an abrupt engagement of the lockup clutch 35. Thus, the lockup clutch is prevented from suffering abrupt change in transmission torque and thence, is prevented from being lowered in the followability to the target value of the feedback control. On the other hand in a case where the ATF temperature is high, the friction modifier is fully activated. Hence, the lockup clutch is less likely to suffer the abrupt change in the transmission torque if the slip ratio of the lockup clutch 35 is set to the tight clutch position. Thus, the embodiment can achieve better fuel economy by setting the slip ratio of the lockup clutch 35 to the tight clutch position.

Second Embodiment

Next, a second embodiment of the invention is described. In the description of the second embodiment and the corresponding drawing, identical or equivalent components to those in the first embodiment will be referred to by like reference characters, a detailed description of which is omitted. Other features than those described as below are the same as in the first embodiment.

Figure 11:
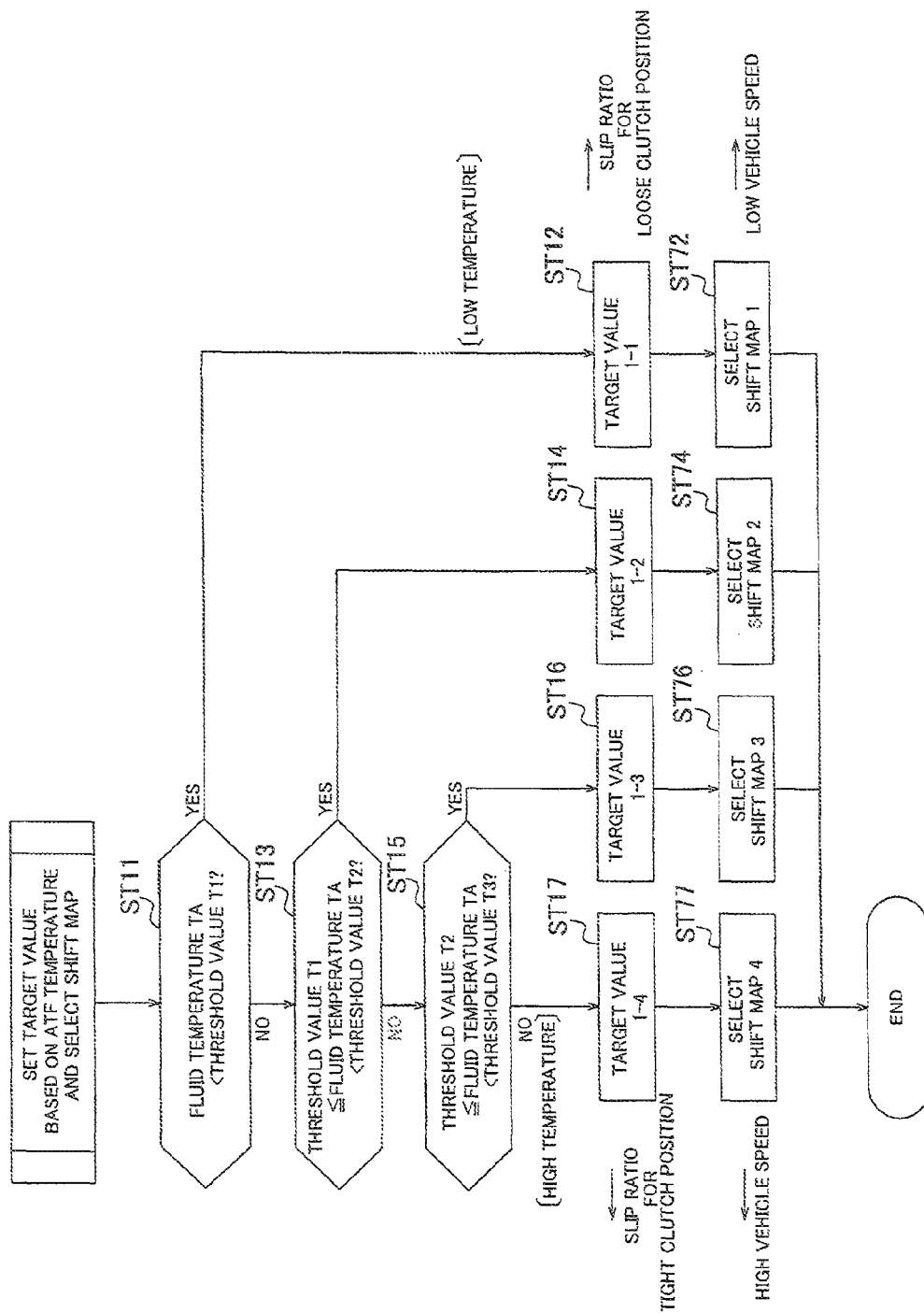
FIG. 11 is a flow chart showing the steps of procedures for setting the target value for selecting the target slip ratio map based on ATF temperature and for switching (selecting) shift maps, the procedures taken by a controller according to a second embodiment of the invention.

FIG. 11 is a flow chart showing the steps of procedures for setting a target value for selecting the target slip ratio map based on the ATF temperature and for switching (selecting) shift maps, the procedures taken by a controller for automatic transmission according to a second embodiment of the invention. In this embodiment, a control for switching the shift maps used for gear shift control, of the automatic transmission 2 is also performed when the target value for selecting the target slip ratio map is set based on the ATF temperature (Step ST10 in FIG. 3). The second embodiment differs from the first embodiment in this point. According to the embodiment, any one of the plural shift maps 52a belonging to the shift map group 52 stored in the memory 51 is correlated with one of the target values 1-1 to 1-4 for selecting the target slip ratio map, respectively. The AT-ECU 5 sets anyone of the target values 1-1 to 1-4 for selecting the target slip ratio map based on the ATF temperature TA detected by the fluid temperature sensor 203. At this time, the AT-ECU 5 also selects one shift map 52a correlated with any one of the target values 1-1 to 1-4 so set.

As seen from the flow chart of FIG. 11, therefore, when the AT-ECU performs Step ST12 to set the target value for the feedback control of the lockup clutch 35 to the "target value 1-1", the AT-ECU concurrently selects a "shift map 1" as a shift map for the gear shift control by the automatic transmission 2 (Step ST72). Likewise, when the AT-ECU performs Step ST14 to set the target value for the feedback control to the "target value 1-2", the AT-ECU also selects a "shift map 2" as the shift map for the gear shift control (Step ST74). When the AT-ECU performs Step ST16 to set the target value for the feedback control to the "target value 1-3", the AT-ECU also selects a "shift map 3" as the shift map for the gear shift control (Step ST7S). When the AT-ECU performs Step ST17 to set the target value for the feedback control to the "target value 1-4", the AT-ECU also selects a "shift map 4" as the shift map for the gear shift control (Step ST77). The shift maps 1 to 4 are characterized in that the shift map 1 corresponds to the lowest vehicle speed and that the shift map 4 corresponds to the highest vehicle speed. Specifically, the shift map 1 is designed such that the low gear is used least frequently and that shifting up is performed at lower vehicle, speed and within shorter time (in comparison based on the same throttle opening). On the other hand, the shift map 4 is designed such that the low gear is used most frequently and that gear shifting is performed at higher vehicle speed and within longer time (in comparison based on the same throttle opening).

When providing control to set the slip ratio of the lockup clutch 35 to the optimum value based on the ATF temperature, the controller of the embodiment also selects the shift map correlated with the value of the slip ratio so that the transmission gear ratio of the transmission mechanism 2a can also be controllably set to the optimum value. Thus, the controller not only permits the lockup clutch 35 to retain the good followability to the target value of the feedback control even when the ATF temperature is in the low temperature range but also permits the transmission mechanism 2a to be set to the optimum gear transmission ratio. Hence, the vehicle is improved in travelling performance.

While the invention has been described in detail by way of the embodiments thereof, it is to be understood that the invention is not limited to the disclosed embodiments. Rather, the invention can be modified to incorporate any number of variations or alterations within the scope of claims and the scope of technical concept described in the specification and the drawings thereof. For example, the above embodiments illustrate the three threshold temperatures T1 to T3 as the threshold value of the ATF temperature at which the slip ratio maps are switched. However, two or less threshold values or four or more threshold values may be defined as the threshold of the ATF temperature.

The invention claimed is:

1. A controller for automatic transmission comprising: a torque converter with a lockup clutch disposed between a vehicle engine and a transmission mechanism of an automatic transmission, control means for controlling an engaging state of the lockup clutch, and hydraulic fluid temperature detecting means for detecting an automatic transmission fluid temperature of the automatic transmission, the control means comprising:
storage means for storing a plurality of target slip ratios of the lockup clutch;
target slip ratio selecting means for selecting one target slip ratio from the plurality of the target slip ratios based on running condition of a vehicle, and
slip control means for controlling the lockup clutch to operate with actual slip ratio thereof following the selected target slip ratio,
wherein the target slip ratio selecting means selects one target slip ratio from the plurality of the target slip ratios based on the automatic transmission fluid temperature detected by the hydraulic fluid temperature detecting means.

2. The controller for automatic transmission according to claim 1, wherein a plurality of threshold temperatures are defined for the automatic transmission fluid temperature used for selecting the target slip ratio, and wherein the target slip ratio selecting means selects one target slip ratio from the plurality of the target slip ratios based on comparison between the automatic transmission fluid temperature detected by the hydraulic fluid temperature detecting means and the plurality of the threshold temperatures.

3. The controller for automatic transmission according to claim 1, wherein as the higher automatic transmission fluid temperature is detected by the hydraulic fluid temperature detecting means, the target slip ratio selecting means selects, from the plurality of the target slip ratios, a target slip ratio for the tighter clutch position, and wherein as the lower automatic transmission fluid temperature is detected by the hydraulic fluid temperature detecting means, the target slip ratio selecting means selects, from the plurality of the target slip ratios, a target slip ratio for the looser clutch position.

4. The controller for automatic transmission according to claim 1, wherein the storage means stores a plurality of shift maps including target values of transmission gear ratio set by the transmission mechanism, any one of the plurality of the shift maps correlated with one of the plurality of the target slip ratios respectively, wherein in the selection of one target slip ratio from the plurality of the target slip ratios based on the automatic transmission fluid temperature detected by the hydraulic fluid temperature detecting means, the shift map correlated with the one target slip ratio is selected, and wherein the control means controls gear shifting by the transmission mechanism based on the selected shift map.

* * * * *